UNITED STATES PATENT OFFICE.

JOHN McLEAN, OF JACKSON, MICHIGAN, ASSIGNOR TO HIMSELF AND IRA EATON, OF SAME PLACE.

IMPROVEMENT IN COMPOSITIONS OF MATTER FOR ARTIFICIAL STONE.

Specification forming part of Letters Patent No. 155,537, dated September 29, 1874; application filed August 31, 1874.

*To all whom it may concern:*

Be it known that I, Dr. JOHN McLEAN, of the city of Jackson, in the county of Jackson and State of Michigan, have invented a certain new and useful Cement Composition for Forming Artificial Stone, to be used for all building and other purposes for which stone is usually made use of, of which the following is a specification, said improvement having reference to a certain invention secured to me by Letters Patent numbered 147,418, and dated February 10, 1874.

This invention relates to a composition formed by mixing sand with Dr. McLEAN's cement, and to the making of said cement by mixing together silica, alumina, anhydrous lime, oxide of iron, black oxide of manganese, sand, magnesia, and anhydrous sulphate of lime, in substantially the following proportions, to wit: Anhydrous lime, one thousand parts; peroxide of iron, ten parts; black oxide of manganese, seven parts; alumina, eight parts; sand, one hundred and twenty parts; magnesia, ten parts; anhydrous sulphate of lime, ten parts.

To apply this composition, take about one part of the cement to ten to fourteen parts of sand; thoroughly mix them; then add water to the mixture until it is of a proper consistency for molding.

The molding may be done by placing the composition thus made in molds, and then thoroughly pressing or tamping it; or it may be done by moistening the mixture sufficiently and running it into molds.

The object of this invention is to furnish a cheap artificial stone, which combines strength, durability, and fire-proof qualities.

The following is claimed new:

1. The compound of the following ingredients, in about the proportions specified, to wit: Anhydrous lime one thousand, peroxide of iron ten, black oxide of manganese seven, alumina eight, silica one hundred and twenty, magnesia ten, and anhydrous sulphate of lime from ten to one hundred parts.

2. The combination of the cement, compounded as above specified, with a body of sand, in the proportions of one part of the cement to about ten to fourteen parts of sand, as set forth.

JOHN McLEAN.

Witnesses:
GROVE H. WALCOTT,
WM. SEWARD GRIDLEY.